(12) United States Patent
Iwanaga et al.

(10) Patent No.: US 7,853,284 B2
(45) Date of Patent: Dec. 14, 2010

(54) TRANSMISSION POWER CONTROL METHOD AND APPARATUS

(75) Inventors: Mitsuo Iwanaga, Tokyo (JP); Yukihiko Okumura, Tokyo (JP); Etsuhiro Okamoto, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 590 days.

(21) Appl. No.: 11/914,103

(22) PCT Filed: May 10, 2006

(86) PCT No.: PCT/JP2006/309421

§ 371 (c)(1),
(2), (4) Date: Nov. 9, 2007

(87) PCT Pub. No.: WO2006/121089

PCT Pub. Date: Nov. 16, 2006

(65) Prior Publication Data

US 2009/0082056 A1    Mar. 26, 2009

(30) Foreign Application Priority Data

May 10, 2005  (JP)  .............................. 2005-137650

(51) Int. Cl.
*H04B 7/185* (2006.01)
*H04B 1/00* (2006.01)
*H04B 7/00* (2006.01)
*H04B 17/00* (2006.01)
*H04B 1/38* (2006.01)
*H04B 7/26* (2006.01)
*H04J 3/00* (2006.01)
*H04W 24/00* (2009.01)

(52) U.S. Cl. ........................... 455/522; 455/69; 455/70; 455/572; 455/67.11; 455/423; 455/452.1; 370/318; 370/336

(58) Field of Classification Search ................. 455/522, 455/69–70, 572, 67.11, 423, 452.1; 370/318, 370/336
See application file for complete search history.

(56) References Cited

U.S. PATENT DOCUMENTS 6,341,224 B1 * 1/2002 Dohi et al. .................. 455/522
6,526,261 B1 * 2/2003 Takeuchi et al. .............. 455/69

(Continued)

FOREIGN PATENT DOCUMENTS

JP    2003-318818    7/2003

(Continued)

*Primary Examiner*—Matthew D Anderson
*Assistant Examiner*—Bobbak Safaipour
(74) *Attorney, Agent, or Firm*—Workman Nydegger

(57) ABSTRACT

In a transmission power control method, a receiver receives user data transmitted intermittently from a transmitter to a receiver and control data transmitted continuously from the transmitter to a plurality of receivers including the receiver via a DPDCH and a CPICH, respectively; and generates, when the receiver is receiving the user data from the transmitter via the DPDCH, a command for controlling transmission power of the transmitter of a DPDCH in a manner that an SIR of a received signal of the DPDCH by the receiver becomes equal to a target SIR, and generates, when the receiver is not receiving the user data from the transmitter via the DPDCH, a command for controlling the transmission power of the transmitter of the DPDCH by updating the target SIR by using received quality of the CPICH.

14 Claims, 5 Drawing Sheets

U.S. PATENT DOCUMENTS

| | | | |
|---|---|---|---|
| 7,664,199 B2 * | 2/2010 | Hirata | 375/296 |
| 2002/0012383 A1 * | 1/2002 | Higuchi et al. | 375/141 |
| 2002/0198014 A1 * | 12/2002 | Miyamoto et al. | 455/522 |
| 2003/0119452 A1 * | 6/2003 | Kim et al. | 455/69 |
| 2003/0134656 A1 * | 7/2003 | Chang et al. | 455/522 |
| 2005/0130689 A1 | 6/2005 | Miyamoto | |
| 2005/0239490 A1 * | 10/2005 | Shintani | 455/522 |
| 2006/0029156 A1 * | 2/2006 | Hirata | 375/296 |
| 2009/0209279 A1 * | 8/2009 | Kuroda et al. | 455/522 |
| 2010/0157956 A1 * | 6/2010 | Takahashi | 370/336 |

FOREIGN PATENT DOCUMENTS

| | | |
|---|---|---|
| JP | 2004-080531 | 3/2004 |
| JP | 2004274117 | 9/2004 |
| JP | 2004-297232 | 10/2004 |
| JP | 2005-005762 | 1/2005 |
| WO | 2004-032374 | 4/2004 |

* cited by examiner

TRANSMISSION POWER CONTROL METHOD AND APPARATUS

TECHNICAL FIELD

The present invention relates to a transmission power control method and apparatus between a transmitter and a receiver (mobile station) for carrying out radio data communication.

BACKGROUND ART

Conventionally, a W-CDMA communications system performs transmission power control for maintaining the communication quality of a dedicated physical channel (DPCH) at a prescribed level.

The transmission power control sometimes performs closed-loop transmission power control in a dual-loop structure of inner-loop control and outer-loop control to maintain stable communication quality under various environments. In this case, the inner-loop control instructs the opposite transmitter to increase or decrease the transmission power to adjust the signal to interference ratio (received SIR) of the radio signal (DPCCH signal) received by the receiver to a target signal to interference ratio (target SIR) as close as possible; and the outer-loop control increases or decreases the target SIR of the inner-loop control to adjust the received block error rate (received BLER: BLock Error Rate) of the received data (user data) decoded from the DPDCH signal in the receiver to the target block error rate (target BLER).

Here, when the transmitter transmits the user data to the receiver intermittently, that is, when the receiver receives the received data (user data or packet data) intermittently via the DPDCH, it cannot measure the received BLER in a section where the user data is not received because of the lack of the data to be measured. In view of this, a method is known of estimating the received BLER required in the outer-loop control in the section where the received BLER cannot be measured.

A proposal is known which uses a fixed value as the target SIR in the received data-less section in the outer-loop control. Besides, another proposal is known which uses the BER of a signal of a dedicated physical control channel (that is, DPCCH signal) for the update control of the target SIR in a transmitted and received data-less section in the outer-loop control. As another calculation method of the BER, a method (re-encoding method) is known which calculates the BER approximately by re-encoding the received data passing through error-correcting decoding and by carrying out bit-by-bit comparison between it and the received data before the error-correcting decoding (see Patent Documents 1 and 2, for example).

FIG. 1 shows a configuration of a conventional mobile station that carries out the outer-loop control using pilot bits of the DPCCH in a section where the user data is not transmitted or received. A radio section 102 performs prescribed receiving processing such as frequency conversion of the signal (received signal) received by an antenna 101. In addition, the radio section 102 performs prescribed transmission processing such as frequency conversion of a DPCH signal from a DPCH spreading section 117 which will be described later, and transmits the DPCH signal passing through the transmission processing via the antenna 101.

A CPICH despreading section 103 despreads the received signal passing through the receiving processing by the radio section 102 by using a spread code assigned to a common pilot channel (CPICH) as shown in FIG. 2A. The CPICH, which is a channel transmitted from the transmitter to the mobile station continuously, includes a known signal. A quality measuring section 105 measures received quality (such as a received bit error rate (BER), a received EC/NO (energy per career to noise power density ratio, or a received RSCP (level)) of the signal (that is, the CPICH signal) passing through the despreading by the CPICH despreading section 103. Typically, the mobile station can carry out communication using the DPDCH by selecting a transmitter to perform communication from among a plurality of transmitters (base stations) based on the received quality of the CPICH signal.

A DPCH modulation section 118 modulates transmission data and a command (that is, TPC bits) for controlling transmission power in the transmitter, which is produced by a TPC bit generating section 114 which will be described later. A DPCH spreading section 117 spreads the TPC bits and transmission data passing through the modulation processing by using a spread code assigned to the DPCH of the mobile station, thereby generating a DPCH signal. In addition, the DPCH spreading section 117 outputs the DPCH signal generated to the radio section 102 described above.

A DPCCH despreading section 106 despreads the received signal passing through the receiving processing by the radio section 102 using the spread code assigned to the mobile station. A DPCCH demodulating section 107 demodulates the signal passing through the despreading by the DPCCH despreading section 106, and generates a demodulation signal including the pilot signal and TFCI signal as shown in FIG. 2B. In addition, the DPCCH demodulating section 107 recognizes from the demodulation signal generated whether the DPDCH signal is transmitted to the mobile station. The DPCCH demodulating section 107 outputs the recognition result to a DPDCH despreading section 109, a DPDCH demodulating section 110, an SIR measuring section 112, and a target SIR calculating section 116.

A pilot error rate measuring section 108 calculates the error rate of the pilot signal included in the received signal demodulated by the DPCCH demodulating section 107, and outputs it to a target SIR calculating section 116.

The DPDCH despreading section 109, when it recognizes from the recognition result from the DPCCH demodulating section 107 that the DPDCH signal is transmitted to the mobile station, despreads the received signal passing through the receiving processing by the radio section 102. The DPDCH demodulating section 110 demodulates the received signal despread by the DPDCH despreading section 109.

A decoding section 111 decodes the received signal demodulated by the DPDCH demodulating section 110, and carries out such processing as error correction, thereby generating received data (user data). In addition, the decoding section 111 outputs the result of the error correction and the like to a error rate measuring section 115.

The error rate measuring section 115 calculates the error rate of the received data after the processing such as the error correction, and outputs it to the target SIR calculating section 116.

The SIR measuring section 112 measures the SIR of the received signal demodulated by the DPCCH demodulating section 107, and outputs it to an SIR comparing section 113.

The SIR comparing section 113 compares the SIR measured by the SIR measuring section 112 with the target SIR calculated by the target SIR calculating section 116, and outputs the compared result to the TPC bit generating section 114.

The TPC bit generating section 114 generates the command for controlling the transmission power of the transmitter in response to the compared result output from the SIR comparing section 113, and outputs it to the DPCH modulation section 118.

The target SIR calculating section 116 calculates the target SIR based on the error rate of the pilot signal calculated by the pilot error rate measuring section 108, the error rate of the received data calculated by the error rate measuring section 115, and the recognition result by the DPCCH demodulating section 107, and updates the target SIR of the SIR comparing section 113.

More specifically, the target SIR calculating section 116 calculates the target SIR by using the error rate of the received data from the error rate measuring section 115 when the DPDCH signal for the mobile station is present, and by using the error rate of the pilot signal from the pilot error rate measuring section 108 when the DPDCH signal for the mobile station is not present, and updates the target SIR of the SIR comparing section 113.

As described above, when the DPDCH signal for the mobile station is not present, updating the target SIR by using the error rate of the pilot signal of the DPCCH enables the estimation of the BLER necessary for the outer-loop control.

However, the outer-loop control using a fixed value as the target SIR in the transmitted and received data-less section presents a problem of causing a failure of the data transmission and reception because of not requiring power in spite of the degradation in quality, or a problem of requiring power even if the quality is good enough.

On the other hand, as for the method that carries out the update control of the target SIR in the transmitted and received data-less section in the outer-loop control using the BER of the DPCCH, when it uses the pilot bits in the DPCCH for calculating the BER, it must take an average over an extended time period to achieve high accuracy because of a small number of pilot bits per radio frame. However, the long time averaging, which has a tendency to deteriorate the trackability to the changes in environments, has a problem of being unable to perform appropriate update of the target SIR when the environments change suddenly. Besides, as for the method (re-encoding method) of calculating the BER approximately by re-encoding the data passing through the error correction decoding, and by carrying out bit-by-bit comparison with the received data before the error correction decoding, it has a problem in that the processing load is heavy in addition to the problem of an error due to uncorrected bits.

Patent Document 1: Japanese patent laid-open No. 2003-318818 (pp. 6-10)

Patent Document 2: Japanese patent laid-open No. 2004-274117 (28th to 35th paragraph, and FIG. 6)

DISCLOSURE OF THE INVENTION

The present invention is implemented to solve the foregoing problems. Therefore it is an object of the present invention to provide a transmission power control method whose processing load is light, whose trackability to the changes in environments is high, and which can maintain the communication quality at a prescribed quality even in the absence of the received data in the dedicated physical data channel (DPDCH).

To accomplish the objects, a first aspect of the present invention is a transmission power control method including the steps of: receiving, at a receiver, user data transmitted intermittently from a transmitter to the receiver and control data transmitted continuously from the transmitter to a plurality of receivers including the receiver via a first channel and a second channel, respectively; and generating, when the receiver is receiving the user data from the transmitter via the first channel, a command for controlling transmission power of the transmitter of the first channel in a manner that an SIR of a received signal of the first channel by the receiver becomes equal to a target SIR, and generating, when the receiver is not receiving the user data from the transmitter via the first channel, a command for controlling the transmission power of the transmitter of the first channel by updating the target SIR by using received quality of the second channel.

In the transmission power control method in accordance with the present invention, the step of generating the command for controlling the transmission power of the transmitter of the first channel can include a step of: deciding an amount of update of the target SIR in response to a magnitude of difference between the received quality of the second channel at a time when user data reception from the transmitter via the first channel is stopped and the current received quality of the second channel.

In the transmission power control method in accordance with the present invention, the receiver can have a movement speed detecting function; and the step of generating the command for controlling the transmission power of the transmitter of the first channel can be halted when the user data is not received via the first channel, and the movement speed of the receiver detected by the detecting function is a particular fixed speed or more.

In the transmission power control method in accordance with the present invention, the receiver can have a movement speed detecting function; and the step of deciding the amount of update of the target SIR further can include a step of adjusting the amount of update of the target SIR in response to the movement speed of the receiver detected by the detecting function.

A second aspect of the present invention is a receiver including: first receiving means for receiving user data transmitted intermittently from a transmitter to the receiver via a first channel; second receiving means for receiving control data transmitted continuously from the transmitter to a plurality of receivers including the receiver via a second channel; means for measuring an SIR of a received signal of the first channel; means for measuring received quality of the second channel; means for generating, when the receiver is receiving the user data from the transmitter via the first channel, a command for controlling transmission power of the transmitter of the first channel in a manner that the SIR of the received signal of the first channel by the receiver becomes equal to a target SIR by comparing the measured SIR of the received signal of the first channel with the target SIR, and for generating, when the receiver is not receiving the user data from the transmitter via the first channel, a command for controlling the transmission power of the transmitter of the first channel by updating the target SIR by using the measured received quality of the second channel; and means for generating a command for controlling the transmission power of the transmitter according to the compared result.

In the receiver in accordance with the present invention, the means for generating the command for controlling the transmission power of the transmitter of the first channel can decide an amount of update of the target SIR in response to a magnitude of difference between the received quality of the second channel at a time when user data reception from the transmitter via the first channel is stopped and the current received quality of the second channel.

In the receiver in accordance with the present invention, the receiver can have movement speed detecting means; and the means for generating the command for controlling the transmission power of the transmitter of the first channel can halt generating the command for controlling the transmission power of the transmitter of the first channel when the user data is not received via the first channel, and the movement speed of the receiver detected by the detecting means is a particular fixed speed or more.

In the receiver in accordance with the present invention, the receiver can have movement speed detecting means; and the means for generating the command for controlling the transmission power of the transmitter of the first channel can adjust the amount of update of the target SIR in response to the movement speed of the receiver detected by the detecting means.

According to the present invention, an appropriate target SIR can be set even when the user data is not transmitted or received via a channel such as a dedicated physical data channel (DPDCH) by updating the target SIR of the outer-loop control by using the received quality of the channel that is transmitted continuously from the transmitter to the plurality of receivers including the receiver, such as a common pilot channel for transmitting a common pilot signal, for example.

In addition, as compared with the case of using the quality of the dedicated physical data channel, it can increase the trackability to the changes in environments with holding down the processing load.

As for a channel such as a CPICH, the transmission power control is not always applied, and its quality has a tendency to deteriorate as the movement speed of the mobile station increases. Thus, it sometimes occurs that excessive quality (that is, excessive transmission power) is required when moving at a high speed. According to the present invention, to avoid such excessive quality, such control is also possible in which if the movement speed exceeds the fixed speed, the update control of the target SIR of the outer-loop control using the channel is halted.

Even if the receiver moves from a high quality environment (in which the BER of a dedicated channel is nearly zero) to a higher quality environment, the quality of the dedicated channel is unchanged superficially. The receiver in accordance with the second aspect of the present invention can easily make a decision as to the changes in the environment with a comparison with the quality at a time when the transmission and reception of the user data halts. Thus, it can control in such a manner as not to require excessive (more than necessary) quality in such a quality environment.

Figure 1:
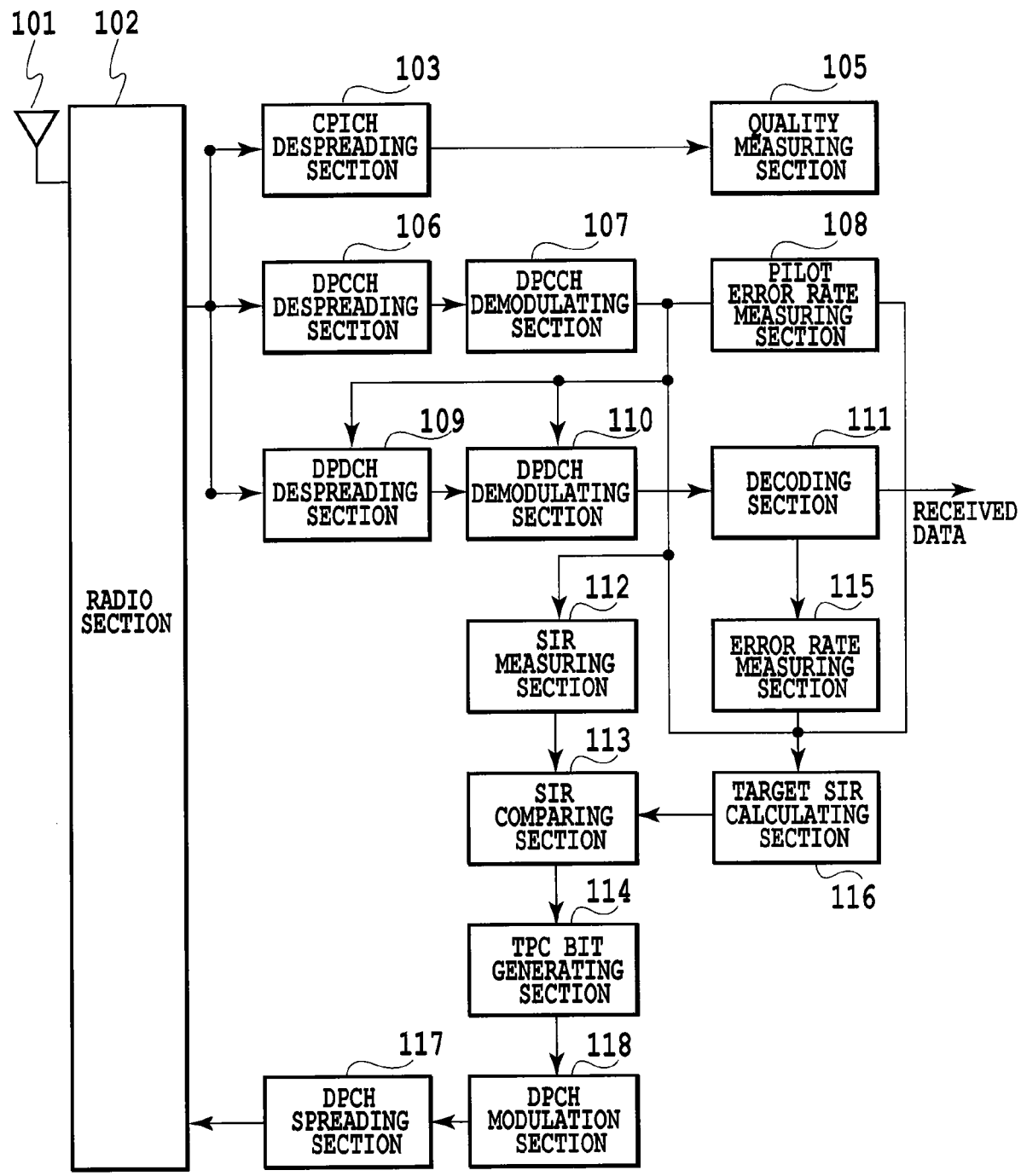
FIG. 1 is a block diagram showing a configuration of a conventional mobile station that carries out outer-loop control using pilot bits of a DPCCH in a section where the user data is not transmitted or received.
Figure 2A:
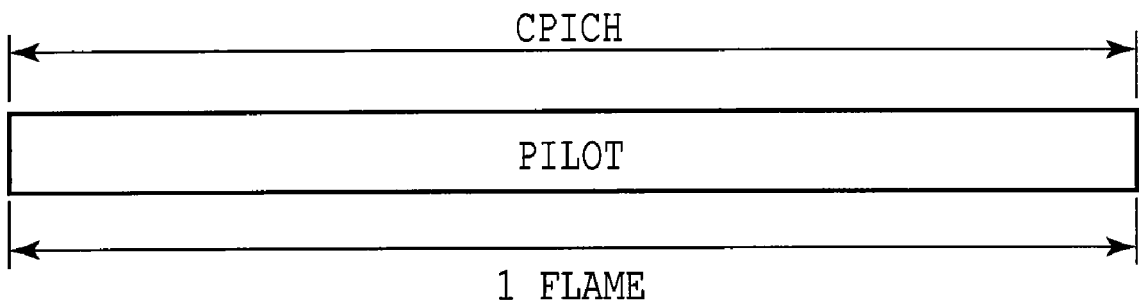
FIG. 2A is a diagram showing a frame structure of a common pilot channel to be transmitted from a base station to a mobile station.
Figure 2B:
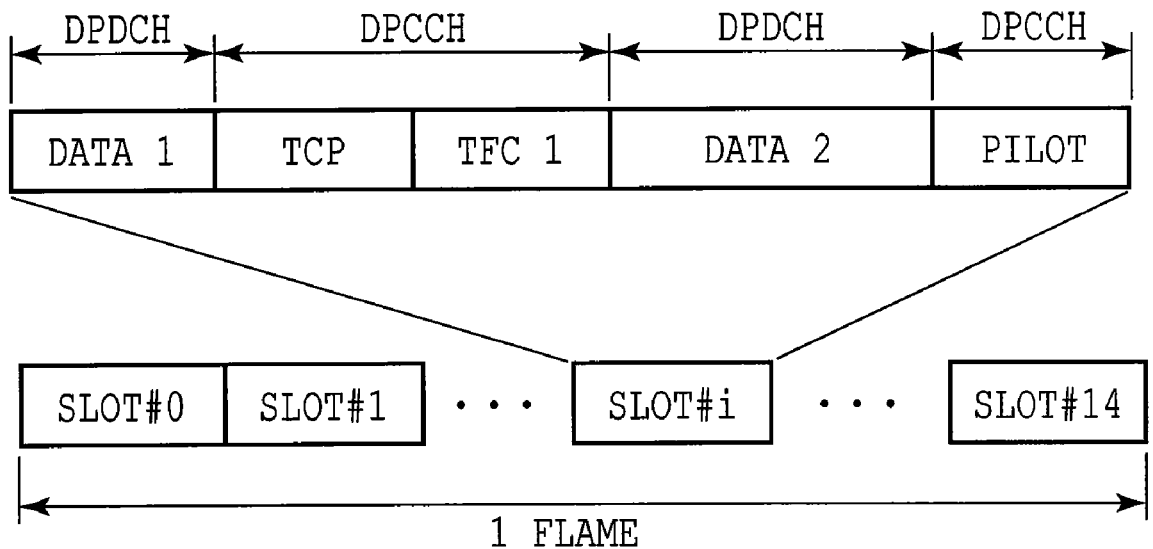
FIG. 2B is a diagram showing a frame structure of a dedicated physical data channel and a dedicated physical control channel.

EXPLANATION OF REFERENCE NUMERALS 101 antenna
102 radio section
103 CPICH despreading section
105,305 quality measuring section
106 DPCCH despreading section
107 DPCCH demodulating section
108 pilot error rate measuring section
109 DPDCH despreading section
110 DPDCH demodulating section
111 decoding section
112 SIR measuring section
113 SIR comparing section
114 TPC bit generating section
115 error rate measuring section
116,316 target SIR calculating section
117 DPCH spreading section
118 DPCH modulation section
319 speed detecting section

BEST MODE FOR CARRYING OUT THE INVENTION

The embodiments in accordance with the invention will now be described with reference to the accompanying drawings.

Figure 3:
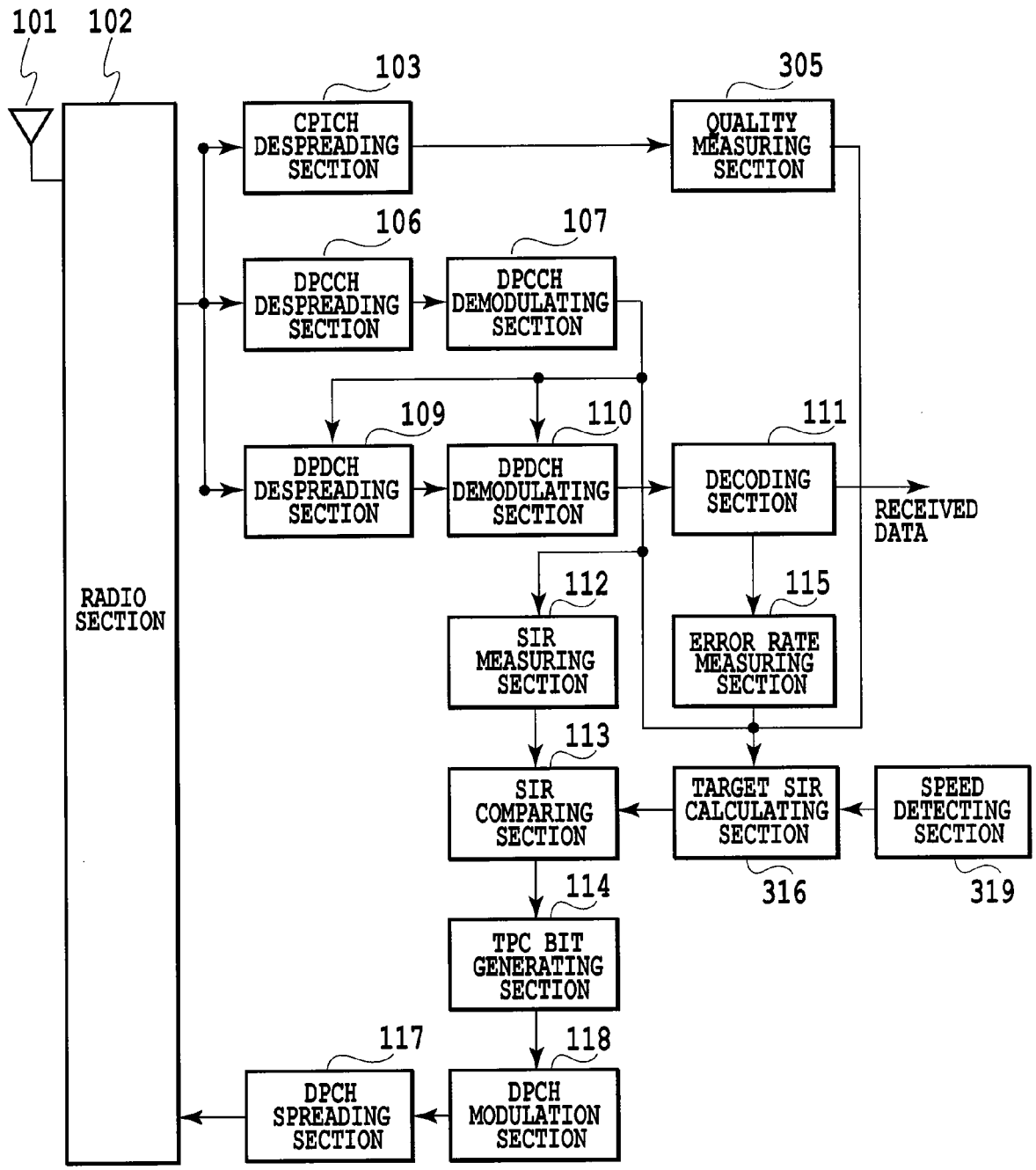
FIG. 3 is a block diagram showing a configuration of a receiver of an embodiment in accordance with the present invention.

FIG. 3 shows a configuration of a mobile station of an embodiment in accordance with the present invention. A radio section 102 performs prescribed receiving processing such as frequency conversion of the signal (received signal) received by an antenna 101. In addition, the radio section 102 performs prescribed transmission processing such as frequency conversion of a DPCH signal from a DPCH spreading section 117 which will be described later, and transmits the DPCH signal passing through the transmission processing via the antenna 101.

A CPICH despreading section 103 despreads the received signal passing through the receiving processing by the radio section 102 by using a spread code assigned to a common pilot channel (CPICH). A quality measuring section 305 measures received quality (such as a received error rate (BER), a received EC/NO (energy per career to noise power density ratio, and a received RSCP (level)) of the signal (that is, the CPICH signal) passing through the despreading by the CPICH despreading section 103, and outputs the received quality of the CPICH signal measured to a target SIR calculating section 316.

A DPCH modulation section 118 modulates transmission data and a command (that is, TPC bits) for controlling transmission power in the transmitter, which is produced by a TPC bit generating section 114. The DPCH spreading section 117 spreads the TPC bits and transmission data passing through the modulation processing by using a spread code assigned to the DPCH of the mobile station, thereby generating a DPCH signal. In addition, the DPCH spreading section 117 outputs the DPCH signal generated to the radio section 102 described above.

A DPCCH despreading section 106 despreads the received signal passing through the receiving processing by the radio section 102 using the spread code assigned to the mobile station. A DPCCH demodulating section 107 demodulates the signal passing through the despreading by the DPCCH despreading section 106, and generates a demodulation signal including the pilot signal and TFCI signal. In addition, the DPCCH demodulating section 107 recognizes from the demodulation signal generated whether the DPDCH signal is transmitted to the mobile station. The DPCCH demodulating section 107 outputs the recognition result to a DPDCH despreading section 109, a DPDCH demodulating section 110, an SIR measuring section 112, and the target SIR calculating section 316.

The DPDCH despreading section 109, when it recognizes from the recognition result from the DPCCH demodulating section 107 that the DPDCH signal is transmitted to the mobile station, despreads the received signal passing through the receiving processing by the radio section 102. The DPDCH demodulating section 110 demodulates the received signal despread by the DPDCH despreading section 109.

A decoding section 111 decodes the received signal demodulated by the DPDCH demodulating section 110, and carries out such processing as error correction, thereby generating received data. In addition, the decoding section 111 outputs the result of the error correction and the like to a error rate measuring section 115.

The error rate measuring section 115 calculates the error rate of the received data after the processing such as the error correction, and outputs it to the target SIR calculating section 316.

The SIR measuring section 112 measures the SIR of the received signal demodulated by the DPCCH demodulating section 107, and outputs it to an SIR comparing section 113.

The SIR comparing section 113 compares the SIR measured by the SIR measuring section 112 with the target SIR calculated by the target SIR calculating section 316 which will be described later, and outputs the compared result to the TPC bit generating section 114.

The TPC bit generating section 114 generates the command for controlling the transmission power of the transmitter in response to the compared result output from the SIR comparing section 113, and outputs it to the DPCH modulation section 118.

A speed detecting section 319 detects the movement speed of the mobile station, and outputs it to the target SIR calculating section 316.

The target SIR calculating section 316 calculates the target SIR from the received quality of the CPICH signal measured by the quality measuring section 305, from the error rate of the received data calculated by the error rate measuring section 115, and from the recognition result by the DPCCH demodulating section 107, and updates the target SIR of the SIR comparing section 113.

In other words, the target SIR calculating section 316 calculates the target SIR by using the error rate of the received data from the error rate measuring section 115 when the DPDCH signal for the mobile station is present, and by using the received quality of the CPICH signal from the quality measuring section 305 when the DPDCH signal for the mobile station is not present, and updates the target SIR of the SIR comparing section 113.

More specifically, according to the recognition result of the DPCCH demodulating section 107, the target SIR calculating section 316 stores the received quality of the CPICH signal from the quality measuring section 305 at the time when the DPDCH signal for the mobile station becomes absent; and starts the calculation of the target SIR using the received quality of the CPICH signal fed from the quality measuring section 305, and the update of the target SIR of the SIR comparing section 113. The calculation of the target SIR is carried out using the difference between the received quality of the CPICH signal at the time when the DPDCH signal for the mobile station, which has been stored, becomes absent, and the received quality of the CPICH signal successively output from the quality measuring section 305. The target SIR calculating section 316 repeats, according to the recognition result of the demodulating section 107, the calculation of the target SIR and the update of the target SIR of the SIR comparing section 113 using the received quality of the CPICH signal from the quality measuring section 305 until the DPDCH signal for the mobile station becomes available.

As described above, when the DPDCH signal for the mobile station is not present, updating the target SIR using the received quality of the CPICH signal makes it possible to estimate the BLER necessary for the outer-loop control. Using the received quality of the CPICH signal to update the target SIR can eliminate the need for calculating the error rate of the pilot signal of the DPCCH, and reduces the processing burden on the mobile station.

In addition, the target SIR calculating section 316 can be configured in such a manner as to calculate the target SIR considering the movement speed of the mobile station detected by the speed detecting section 319, and to update the target SIR of the SIR comparing section 113.

More specifically, the target SIR calculating section 316 can be configured in such a manner as to update the target SIR using the received quality of the CPICH signal when the DPDCH signal for the mobile station is not present and the mobile station moves at less than a fixed speed, and as to inhibit the update of the target SIR using the received quality of the CPICH signal when the DPDCH signal for the mobile station is not present and the mobile station moves at the fixed speed or more.

Alternatively, the target SIR calculating section 316 can be configured in such a manner that when the DPDCH signal for the mobile station is not present, it updates the target SIR of the SIR comparing section 113 after adjusting the amount of increase or decrease of the target SIR, which is calculated by using the received quality of the CPICH signal, in accordance with the movement speed of the mobile station.

Configuring the target SIR calculating section 316 as described above makes it possible to avoid excessive quality (producing a command to increase the transmission power of the transmitter excessively) caused by the deterioration of the received quality of the CPICH signal involved in the high speed movement of the mobile station.

Figure 4:
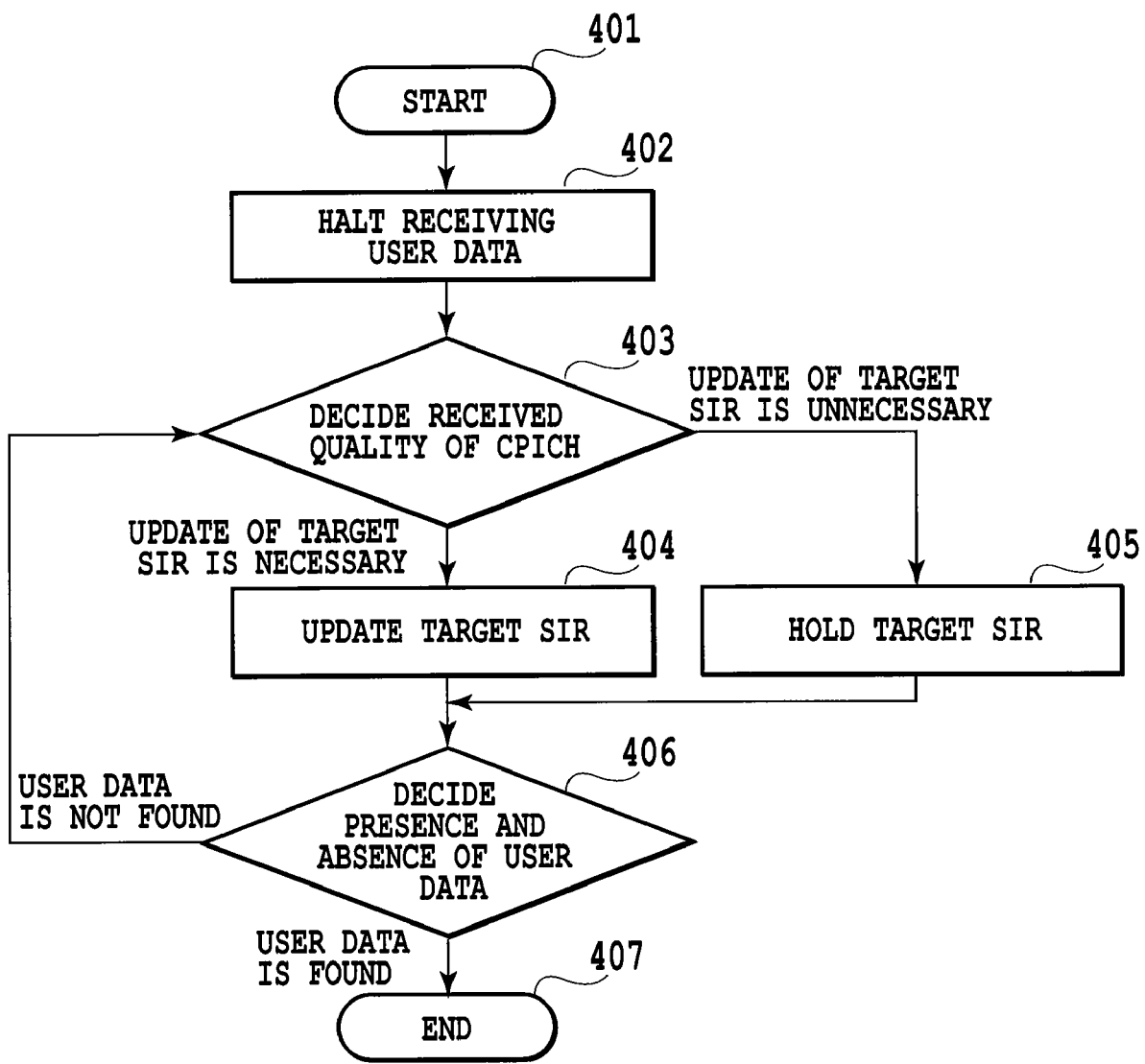
FIG. 4 is a flowchart illustrating a power control method of an embodiment in accordance with the present invention.

Referring to FIG. 4, the embodiment of the transmission power control in accordance with the present invention will be described.

While the transmitter is transmitting user data and the receiver is receiving the user data, the mobile station controls the transmission power with the inner-loop control including the DPCCH demodulating section 107, SIR measuring section 112, SIR comparing section 113, and TPC bit generating section 114, and with the outer-loop control including the decoding section 111, error rate measuring section 115, and target SIR calculating section 316. Thus, as part of the outer-loop control, the target SIR calculating section 316 repeats updating the target SIR of the SIR comparing section 113 by calculating the target SIR from the error rate of the received data (user data) from the measuring section 115 (step 401).

When the user data reception is stopped in the receiver, the target SIR calculating section 316 recognizes that the user data reception via the DPDCH is stopped according to the recognition result from the DPCCH demodulating section 107 (step 402).

Subsequently, the target SIR calculating section 316 starts the calculation of the target SIR using the received quality of the CPICH signal from the quality measuring section 305, and the update of the target SIR of the SIR comparing section 113. It makes a quality decision of the CPICH according to the received quality of the CPICH signal output from the quality measuring section 305 (step 403).

When it makes a decision that the update of the target SIR is necessary, the target SIR calculating section 316 calculates the target SIR, and updates the target SIR of the SIR comparing section 113 (step 404). For example, the target SIR can be calculated by storing the received quality of the CPICH and the target SIR with establishing one-to-one correspondence between them. When it does not make a decision that the update of the target SIR is necessary, the target SIR calculating section 316 does not update the target SIR of the SIR comparing section 113, thereby maintaining the current target SIR (step 405).

According to the recognition result from the DPCCH demodulating section 107, the target SIR calculating section 316 makes a decision as to the presence and absence of the user data addressed to the mobile station (step 406), and if the user data is absent, it repeats from step 403 to step 406.

Figure 5:
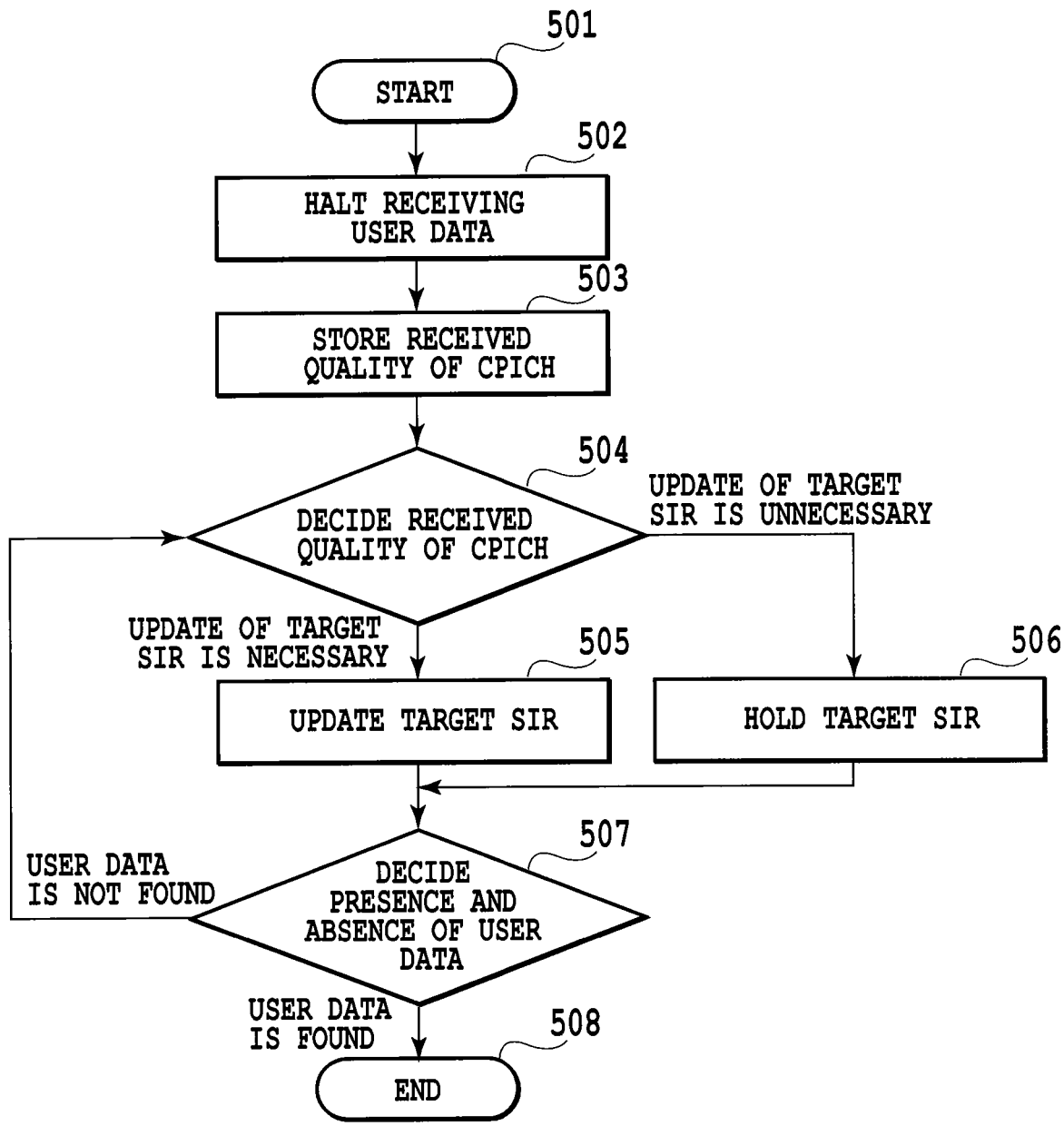
FIG. 5 is a flowchart illustrating a power control method of another embodiment in accordance with the present invention.

Referring to FIG. 5, another embodiment of the transmission power control in accordance with the present invention will be described.

While the transmitter is transmitting user data and the receiver is receiving the user data, the mobile station controls the transmission power with the inner-loop control including the DPCCH demodulating section 107, SIR measuring section 112, SIR comparing section 113, and TPC bit generating section 114, and with the outer-loop control including the decoding section 111, error rate measuring section 115, and target SIR calculating section 316. Thus, as part of the outer-loop control, the target SIR calculating section 316 repeats updating the target SIR of the SIR comparing section 113 by calculating the target SIR from the error rate of the received data (user data) from the measuring section 115 (step 501).

When the user data reception is stopped in the receiver, the target SIR calculating section 316 recognizes that the user data reception via the DPDCH is stopped according to the recognition result from the DPCCH demodulating section 107 (step 502).

Subsequently, the target SIR calculating section 316 stores the received quality of the CPICH signal from the quality measuring section 305 (step 503); and starts the calculation of the target SIR using the received quality of the CPICH signal from the quality measuring section 305, and the update of the target SIR of the SIR comparing section 113. The target SIR calculating section 316 makes a quality decision of the CPICH by comparing the received quality of the CPICH signal at the time when the DPDCH signal for the mobile station becomes absent with the received quality of the CPICH signal successively output from the quality measuring section 305 (step 504).

When the target SIR calculating section 316 makes a decision that the update of the target SIR is necessary (that is, when the fluctuations from the received quality of the CPICH signal are large during the stop of the user data reception (that is, when it makes a decision from the received quality of the CPICH signal that the BLER would differ greatly from the target BLER at the time when the user data reception is restarted)), the target SIR calculating section 316 calculates the target SIR and updates the target SIR of the SIR comparing section 113 (step 505). When it does not make a decision that the update of the target SIR is necessary, the target SIR calculating section 316 does not update the target SIR of the SIR comparing section 113, thereby maintaining the current target SIR (step 505). The new target SIR is calculated in accordance with the difference between the received quality of the CPICH signal at the time when the DPDCH signal for the mobile station, which has been stored, becomes absent, and the received quality of the CPICH signal successively output from the quality measuring section 305. For example, the mobile station can possess a calculation equation about the amount of update of the target SIR corresponding to the difference between the received qualities of the CPICH signal, and can decide the amount of increase or decrease of the target SIR in accordance with the difference.

According to the recognition result from the DPCCH demodulating section 107, the target SIR calculating section 316 makes a decision as to the presence and absence of the user data addressed to the mobile station (step 507), and if the user data is absent, it repeats from step 504 to step 507.

Furthermore, according to still another embodiment of the transmission power control in accordance with the present invention, such a configuration is also possible in which at the foregoing step 404 or step 505, the target SIR calculating section 316 calculates the new target SIR corresponding to the movement speed of the mobile station from the speed detecting section 319. When the movement speed of the mobile station is high, the received quality of the user data is worse than the received quality of the user data when the movement speed is low. Accordingly, when the movement speed is high, the amount of increase of the target SIR can be made greater than when the movement speed is low or zero. This enables the power control with higher trackability to the changes in environments involved in moving.

Moreover, at the foregoing step 404 or step 505, if the DPDCH signal for the mobile station is absent and the mobile station moves at a fixed speed or more, such a configuration is also possible which inhibits the update of the target SIR using the received quality of the CPICH signal. This makes it possible to prevent the mobile station from requiring excessive transmission power from the transmitter.

Incidentally, the present invention is not limited to the scope disclosed by the foregoing embodiments. It will now be apparent that changes and modifications can be made without departing from the scope of the technical concept of the present invention, and they also fall within the technical scope of the present invention.

INDUSTRIAL APPLICABILITY

As described above, according to the present invention, it is possible even in the section in which the user data is neither transmitted nor received to carry out the update control of the target SIR by the outer-loop control in response to the changes in the radio environments, and to maintain appropriate received power even in the case where the radio environments change abruptly.

What is claimed is:

1. A transmission power control method comprising the steps of:

receiving, at a receiver, user data transmitted intermittently from a transmitter to said receiver and control data transmitted continuously from said transmitter to a plurality of receivers including said receiver via a first channel and a second channel, respectively; and generating, when said receiver is receiving the user data from said transmitter via said first channel, a command for controlling transmission power of said transmitter of said first channel in a manner that an SIR of a received signal of said first channel by said receiver becomes equal to a target SIR, and generating, when said receiver is not receiving the user data from said transmitter via said first channel, a command for controlling the transmission power of said transmitter of said first channel by updating the target SIR by using received quality of said second channel.

2. The transmission power control method as claimed in claim 1, wherein the step of generating the command for controlling the transmission power of said transmitter of said first channel comprises a step of:
deciding an amount of update of the target SIR in response to a magnitude of difference between the received quality of said second channel at a time when user data reception from said transmitter via said first channel is stopped and the current received quality of said second channel.

3. The transmission power control method as claimed in claim 2, wherein
said receiver has a movement speed detecting function; and
the step of generating the command for controlling the transmission power of said transmitter of said first channel is halted when the user data is not received via said first channel, and the movement speed of said receiver detected by the detecting function is a particular fixed speed or more.

4. The transmission power control method as claimed in claim 3, wherein
the step of deciding the amount of update of the target SIR further comprises a step of adjusting the amount of update of the target SIR in response to the movement speed of said receiver detected by the detecting function.

5. The transmission power control method as claimed in claim 2, wherein
said receiver has a movement speed detecting function; and
the step of deciding the amount of update of the target SIR further comprises a step of adjusting the amount of update of the target SIR in response to the movement speed of said receiver detected by the detecting function.

6. The transmission power control method as claimed in claim 1, wherein
said receiver has a movement speed detecting function; and
the step of generating the command for controlling the transmission power of said transmitter of said first channel is halted when the user data is not received via said first channel, and the movement speed of said receiver detected by the detecting function is a particular fixed speed or more.

7. The transmission power control method as claimed in claim 6, wherein
the step of deciding the amount of update of the target SIR further comprises a step of adjusting the amount of update of the target SIR in response to the movement speed of said receiver detected by the detecting function.

8. A receiver comprising:
first receiving means for receiving user data transmitted intermittently from a transmitter to said receiver via a first channel;
second receiving means for receiving control data transmitted continuously from said transmitter to a plurality of receivers including said receiver via a second channel;
means for measuring an SIR of a received signal of said first channel;
means for measuring received quality of said second channel;

means for generating, when said receiver is receiving the user data from said transmitter via said first channel, a command for controlling transmission power of said transmitter of said first channel in a manner that the SIR of the received signal of said first channel by said receiver becomes equal to a target SIR by comparing the measured SIR of the received signal of said first channel with the target SIR, and for generating, when said receiver is not receiving the user data from said transmitter via said first channel, a command for controlling the transmission power of said transmitter of said first channel by updating the target SIR by using the measured received quality of said second channel.

9. The receiver as claimed in claim 8, wherein said means for generating the command for controlling the transmission power of said transmitter of said first channel decides an amount of update of the target SIR in response to a magnitude of difference between the received quality of said second channel at a time when user data reception from said transmitter via said first channel is stopped and the current received quality of said second channel.

10. The receiver as claimed in claim 9, wherein
said receiver has movement speed detecting means; and
said means for generating the command for controlling the transmission power of said transmitter of said first channel halts generating the command for controlling the transmission power of said transmitter of said first channel when the user data is not received via said first channel, and the movement speed of said receiver detected by said detecting means is a particular fixed speed or more.

11. The receiver as claimed in claim 10, wherein
said means for generating the command for controlling the transmission power of said transmitter of said first channel adjusts the amount of update of the target SIR in response to the movement speed of said receiver detected by said detecting means.

12. The receiver as claimed in claim 9, wherein
said receiver has movement speed detecting means; and
said means for generating the command for controlling the transmission power of said transmitter of said first channel adjusts the amount of update of the target SIR in response to the movement speed of said receiver detected by said detecting means.

13. The receiver as claimed in claim 8, wherein
said receiver has movement speed detecting means; and
said means for generating the command for controlling the transmission power of said transmitter of said first channel halts generating the command for controlling the transmission power of said transmitter of said first channel when the user data is not received via said first channel, and the movement speed of said receiver detected by said detecting means is a particular fixed speed or more.

14. The receiver as claimed in claim 13, wherein
said means for generating the command for controlling the transmission power of said transmitter of said first channel adjusts the amount of update of the target SIR in response to the movement speed of said receiver detected by said detecting means.

* * * * *